United States Patent
Wang et al.

(10) Patent No.: US 7,368,035 B2
(45) Date of Patent: May 6, 2008

(54) METHOD FOR BRAZING AND ADHESIVE BONDING

(75) Inventors: Pei-Chung Wang, Troy, MI (US); John D. Fickes, Brighton, MI (US); Anthony V. Minatel, Fenton, MI (US); Dean T. Quaderer, Sterling Heights, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 0 days.

(21) Appl. No.: 11/341,703

(22) Filed: Jan. 27, 2006

(65) Prior Publication Data

US 2007/0175568 A1    Aug. 2, 2007

(51) Int. Cl.
*B29C 65/02* (2006.01)
*B29C 65/22* (2006.01)
*B29C 65/50* (2006.01)
*B29C 65/54* (2006.01)
*B29C 65/44* (2006.01)
*B29C 65/24* (2006.01)
*B29C 65/74* (2006.01)

(52) U.S. Cl. ............... 156/304.3; 156/304.1; 156/304.6; 156/306.6; 156/157; 219/86.1; 219/101; 219/104; 219/148; 228/141.1; 228/254; 228/262.9; 29/DIG. 4; 29/DIG. 38; 29/DIG. 48

(58) Field of Classification Search ............ 156/304.1, 156/304.3, 307.1, 73.5, 157, 295, 304.6, 156/306.6, 321; 228/254, 262.9, 141.1; 29/DIG. 4, 29/DIG. 38, DIG. 48; 219/86.1, 101, 104, 219/148

See application file for complete search history.

(56) References Cited

U.S. PATENT DOCUMENTS

| | | | | |
|---|---|---|---|---|
| 3,736,653 A * | 6/1973 | Maierson et al. | ........... | 228/224 |
| 4,477,527 A * | 10/1984 | Grosner | ...................... | 428/401 |
| 5,354,414 A * | 10/1994 | Feygin | ......................... | 216/34 |
| 5,743,989 A * | 4/1998 | Kumagai et al. | ........ | 156/273.9 |
| 2004/0035504 A1 * | 2/2004 | Ananthanarayanan et al. | ........................ | 148/519 |
| 2006/0249562 A1 * | 11/2006 | Voice et al. | ............. | 228/262.9 |

FOREIGN PATENT DOCUMENTS

JP            05185274 A *   7/1993

* cited by examiner

*Primary Examiner*—Philip C. Tucker
*Assistant Examiner*—Sonya Mazumdar

(57) ABSTRACT

An improved method for joining together the edge portions of first and second panels includes applying a heat curable adhesive along the edge portion of the first panel and then abutting the edge portion of the second panel with the edge portion of the first panel so that the adhesive is interposed between the edge portions of the first and second panels and the adhesive spaces the panels apart and provides a gap between the panels. A brazing material is melted and fills the gap and the heating of the panels by the brazing causes at least partial curing of the adhesive so that the panels are joined together by both brazing and adhesive bonding.

5 Claims, 3 Drawing Sheets

METHOD FOR BRAZING AND ADHESIVE BONDING

FIELD OF THE INVENTION

The present invention relates to joining together metal work pieces, and more particularly to joining by brazing and adhesive bonding.

BACKGROUND OF THE INVENTION

It is known to join together overlapping portions of sheet metal panels by depositing a molten brazing material that bonds the panels together. It is also known to join together overlapping portions of sheet metal panels by applying an adhesive between the panels and curing the adhesive.

SUMMARY OF THE INVENTION

An improved method for joining together the edge portions of first and second panels includes applying a heat curable adhesive along the edge portion of the first panel and then abutting the edge portion of the second panel with the edge portion of the first panel so that the adhesive is interposed between the edge portions of the first and second panels and the adhesive spaces the panels apart and provides a gap between the panels for optimal brazing. A brazing material is melted and fills the gap and the heating of the panels by the brazing causes at least partial curing of the adhesive so that the panels are joined together by both brazing and adhesive bonding Further areas of applicability of the present invention will become apparent from the detailed description provided hereinafter. It should be understood that the detailed description and specific examples, while indicating exemplary embodiments of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE EXEMPLARY EMBODIMENTS

The following description of certain exemplary embodiments is merely exemplary in nature and is not intended to limit the invention, its application, or uses.

Figure 1:
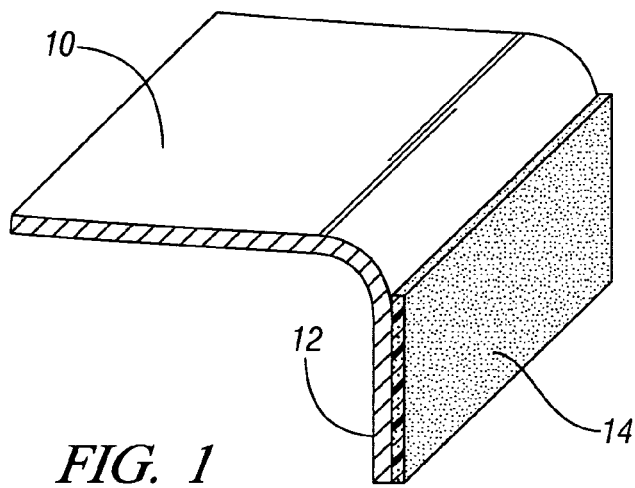
FIG. 1 is a perspective view of a first panel with a flange and an adhesive adhered along the flange.

Referring to FIG. 1, a first panel 10 of sheet metal has a downturned flange 12. A bead of heat curable adhesive 14 such as Dow Betamate 1480 is laid against the flange 12. The heat curable adhesive 14 may be a tape that has a sticky surface on at least the side of the tape faces the flange 12 so the tape will adhere to the flange 12 and hold itself in place as shown in FIG. 1.

Figure 2:
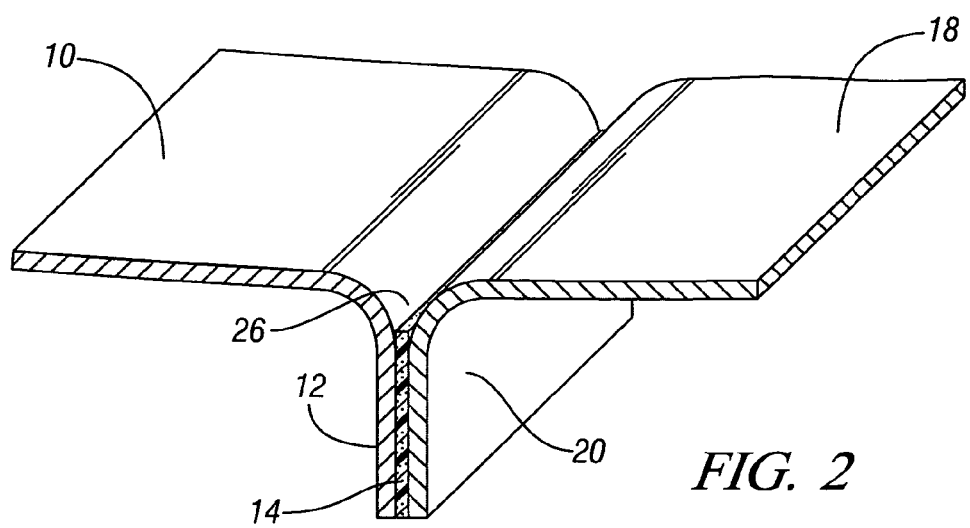
FIG. 2 is a perspective view showing a second panel with a flange abutting the flange of the first panel.

Referring to FIG. 2, a second panel 18, also of sheet metal, has a downturned flange 20, and the second panel 18 has been placed adjacent the first panel 10 so that the flange 20 of second panel abuts the flange 12 of the first panel 10 with the bead of heat curable adhesive 14 interposed between the flanges.

Figure 3:
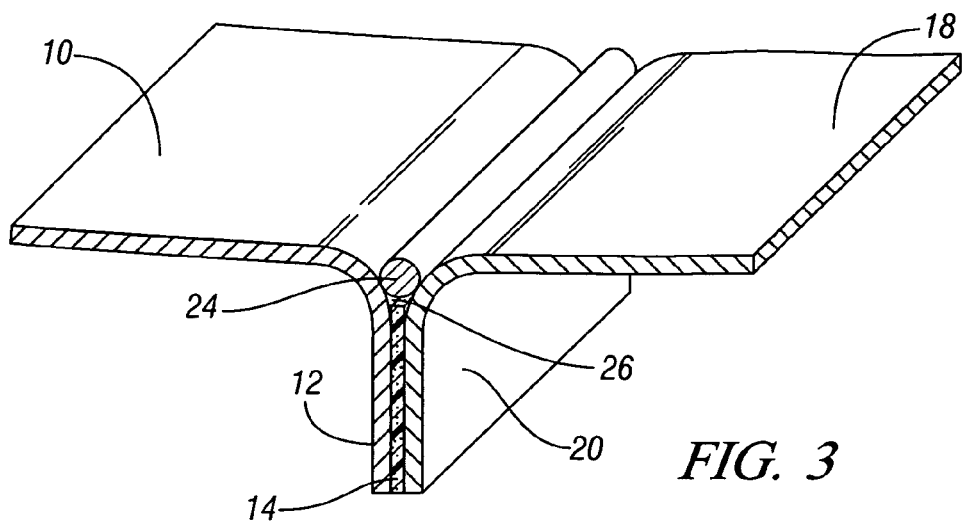
FIG. 3 is a perspective view showing a wire of brazing material lying in the gap between the first and second panels.

Referring to FIG. 3, a wire 24 of brazing material has been laid in the gap 26 at the juncture of the first panel 10 and second panel 18. One example of a brazing material suitable for steel panels is a silicon bronze material.

Figure 4:
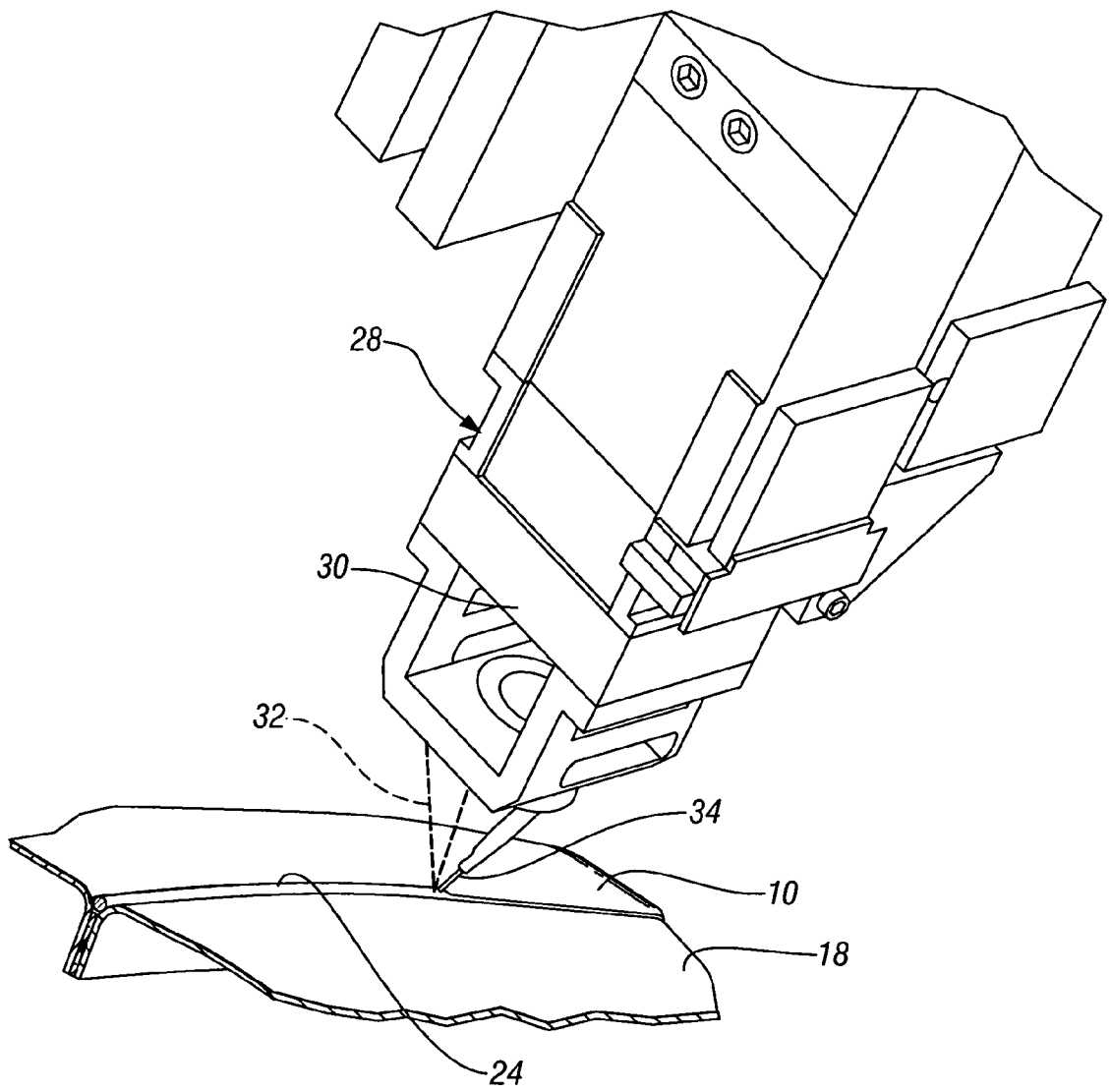
FIG. 4 is a perspective view of a laser heating machine that melts the wire of brazing material.

Referring to FIG. 4, it is seen that a laser heating machine 28 mounted on a robotic arm is hovering above the panels 10 and 18. The laser heating machine 28 has a laser source 30 that emits a laser beam 32 aimed at the wire 24 of brazing material. A vision device, not shown, steers the laser weld machine 28 along the path of the wire 24. A pipe 34 provides a shielding gas. The laser beam 32 heats the wire 24 and melts the brazing material of the wire 24 so that liquid brazing material flows into the gap 26. The brazing material melts at a temperature of >450 degrees C. A local region of the first and second panels 10 and 18 adjacent to the wire 24 is heated by the laser beam 32. And as the molten material flows into the gap and re-solidifies, heat is transferred into the flanges 12 and 20 and heat is also transferred to the heat curable adhesive 14 to partly or completely cure the adhesive.

It will be appreciated that the first panel 10 and the second panel 18 are thus joined together by creating both a brazing bond and an adhesive bond between the flanges 12 and 20. In addition, the presence of the adhesive bond will assure sealing of the joint against a water leak in the event of any imperfection of the brazed bond. Thus the adhesive 14 acts as an adhesive-sealer.

Figure 5:
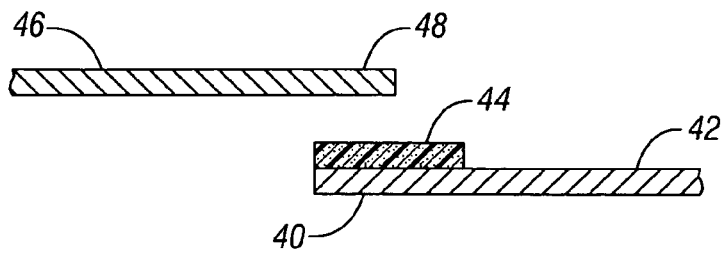
FIG. 5 is an end view of another embodiment in which a first panel has a bead of adhesive along an edge portion of the first panel.

Another embodiment of the invention is shown in FIG. 5. An edge portion 40 of a first panel 42 has a bead of heat curable adhesive 44 placed along the edge portion 40. A second panel 46, having an edge portion 48, is poised above the first panel 42.

Figure 6:
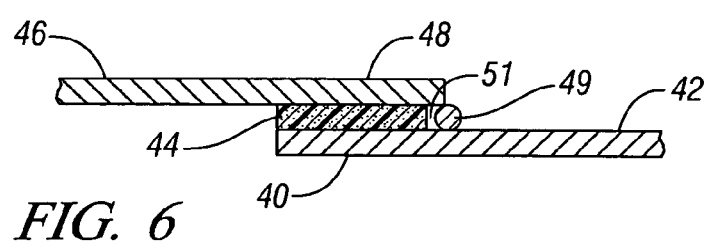
FIG. 6 is a view similar to FIG. 5 but showing a second panel with an edge portion placed atop the first panel and a wire of brazing material extending along the gap between the first and second panels.

In FIG. 6, the second panel 46 is laid atop the first panel 42, so that the edge portion 48 of the second panel 46 engages the bead of adhesive 44. A wire 49 of brazing material is laid against the gap 51 between the edge portions of the first panel 42 and the second panel 46.

Figure 7:
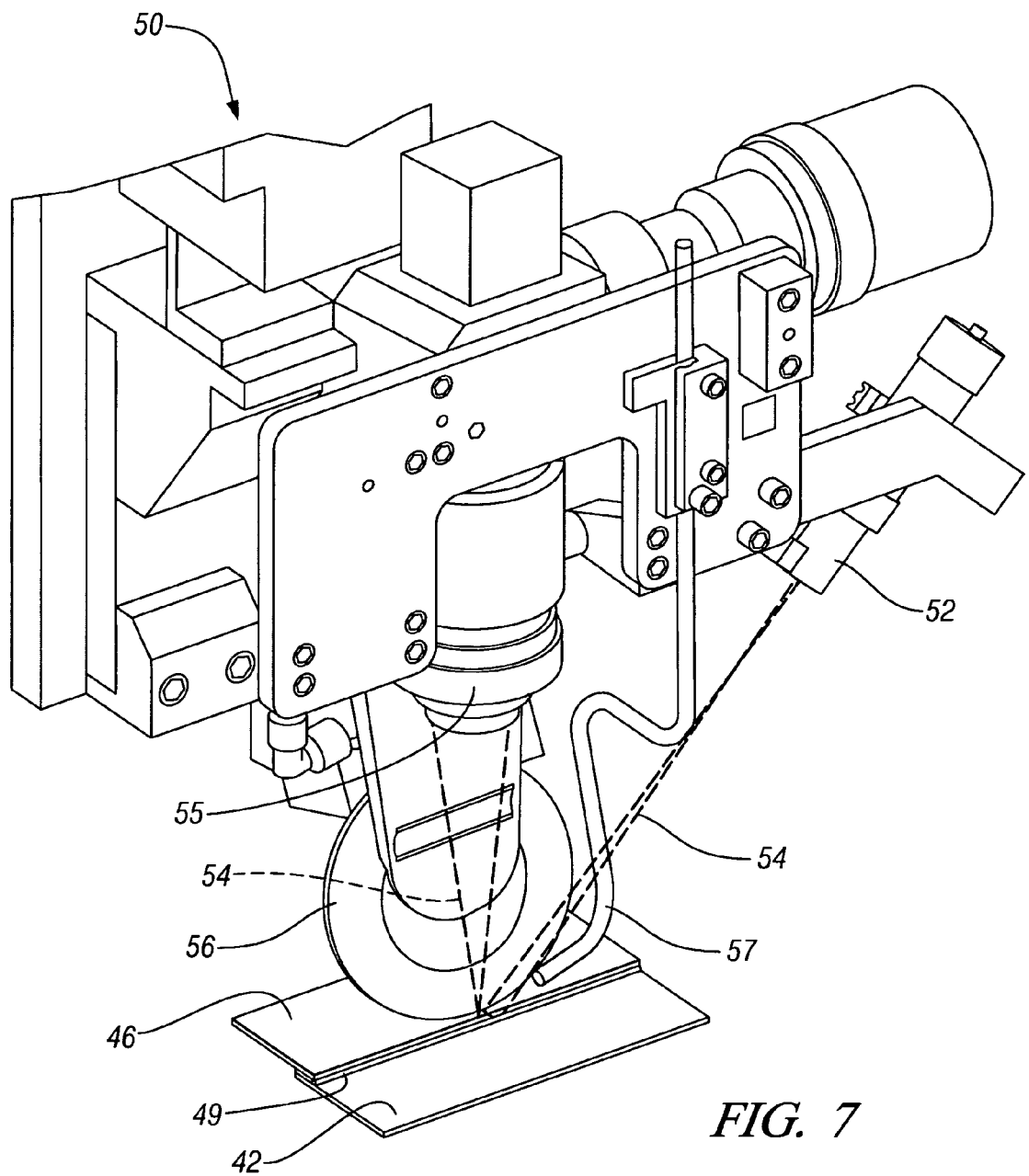
FIG. 7 is a perspective view showing a laser heating machine that melts the brazing material and cures the adhesive to form a lap joint.

In FIG. 7 a laser heating machine 50 is poised above the first and second panels 42 and 46 and carried by a robotic arm, not shown. The laser heating machine 50 has a laser source 55 that emits a laser beam 54 aimed at the wire 49 of brazing material. A vision device 52 steers the laser welder 50 along the path of the wire 49. A pressure wheel 56 engages the second panel 46 and forces the second panel 46 into engagement with the adhesive 44. A pipe 57 provides a shielding gas, if desired, for the laser brazing operation. The laser beam 54 heats the wire 49 and melts the brazing material of the wire 49 so that liquid brazing material flows into the gap 51 by capillary action. The heat generated by the laser beam 54 will cure the adhesive 44 either partially or completely. Complete curing can occur later, for example upon passage of the sheet metal panels through a paint curing oven.

Figure 8:
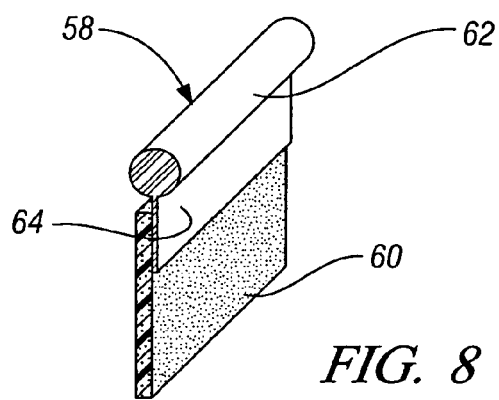
FIG. 8 is a perspective view of a pre-fabricated brazing wire and heat cured adhesive strip.

Referring to FIG. 8, a pre-fabricated assembly 58 of the wire and adhesive is provided. An adhesive bead 60 is joined to a wire 62 of brazing material. The wire 62 is formed to include a depending leg 64 that is continuous along its length. The bead of adhesive 60, in the form of a tape, is bonded to the depending leg 64 of the wire 62. If desired, the bead of adhesive 60 can be extruded onto the depending leg 64. This prefabricated assembly 58 facilitates the placement of the adhesive and the wire. For example, in the case of the flanged panels of FIGS. 1-4, the panels may be moved close together and then the pre-fabricated assembly 58 is dropped into the gap between the flanges 12 and 20. The diameter of the wire 62 is greater than the width of the adhesive bead 60, so that the wire 62 works to suspend the adhesive bead 60 between the flanges 12 and 20 so that the panels 10 and 18 can be pushed further together to their final positions in readiness for brazing by the laser heater. In the case of the panels of FIGS. 5-7, the placement of the adhesive bead onto the edge portion 40 of the panel 42 will simultaneously position the wire in readiness for the placement of the second panel 46.

In a typical application of the invention, the laser is a 4 kW flash lamp Trumf laser, positioned 2 mm above the work piece, and traveling at a rate of three meters per minute. The brazing wire may be a silicon braze wire of a 1.6 mm diameter.

The foregoing description of the invention is merely exemplary in nature and, thus, variations thereof are intended to be within the scope of the invention.

What is claimed is:

1. A method of joining together edge portions of first and second panels, comprising:
    attaching a wire of brazing material to a tape of heat curable adhesive-sealer so that the wire and the tape extend parallel to one another,
    positioning the tape to lie between and engage with the edge portions of the first and second panels and create a gap between the panels, with the wire positioned along the gap;
    and applying heat to melt the wire of brazing material and at least partially cure the heat curable adhesive-sealer so that the first and second panels are joined together by brazing and adhesive-sealer bonding.

2. The method of claim 1 in which the edge portions of the first and second panels are flanges that extend along the panels and the tape lies between the flanges.

3. The method of claim 1 in which the edge portions of the first and second panels form a lap joint with tape interposed between the edge portions of the first and second panels.

4. The method of claim 1 in which the wire is formed with a depending leg extending along the length of the wire and the strip of adhesive-sealer tape is adhered to the depending leg and extending along the length of the wire.

5. A method of joining together edge portions of first and second panels, comprising:
    providing a wire of brazing material having a depending leg extending along the length thereof;
    assembling a strip of heat curable adhesive tape to the wire of brazing material by adhering the tape to the depending leg;
    adhering the strip of tape along the edge portion of the first panel;
    abutting the edge portion of the second panel with the edge portion of the first panel so that the tape is interposed between the edge portions of the first and second panels and the tape spaces the panels apart and provides a gap between the panels;
    and heating the brazing material to a molten state to fill the gap, and the heated molten brazing material heating the panels causing at least partial curing of the adhesive-sealer so that the first and second panels are joined together by both the adhesive and the brazing material.

* * * * *